Nov. 8, 1932.  G. D. PRATT ET AL  1,887,325
TRAILER
Filed May 21, 1930    4 Sheets-Sheet 1
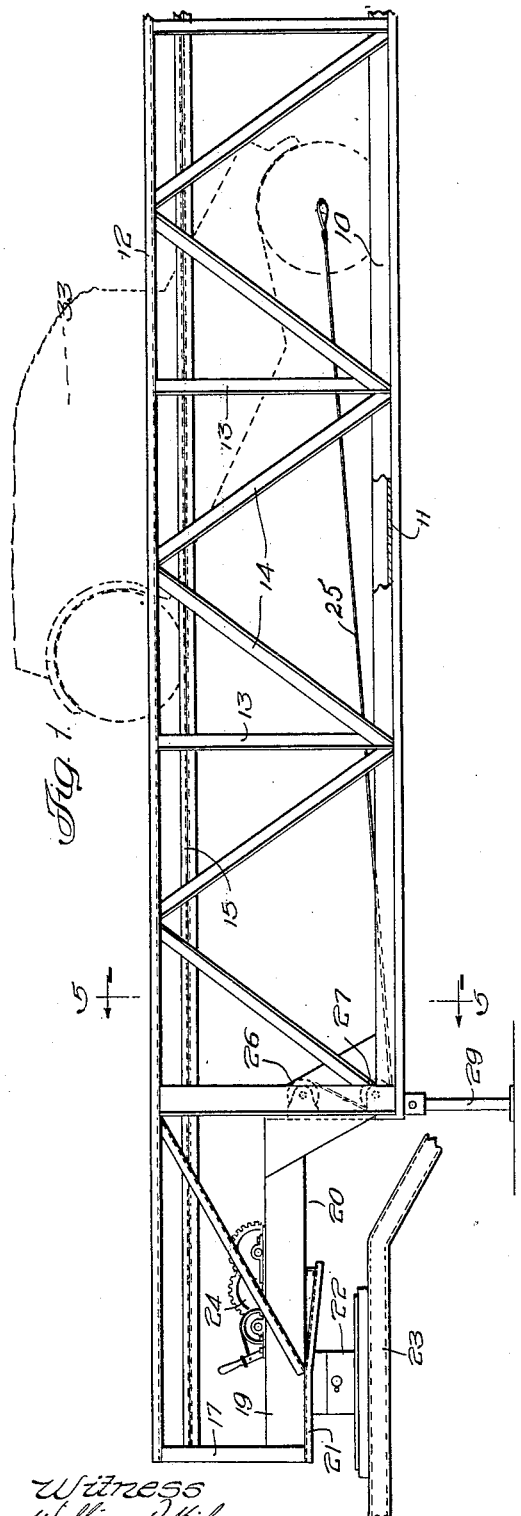
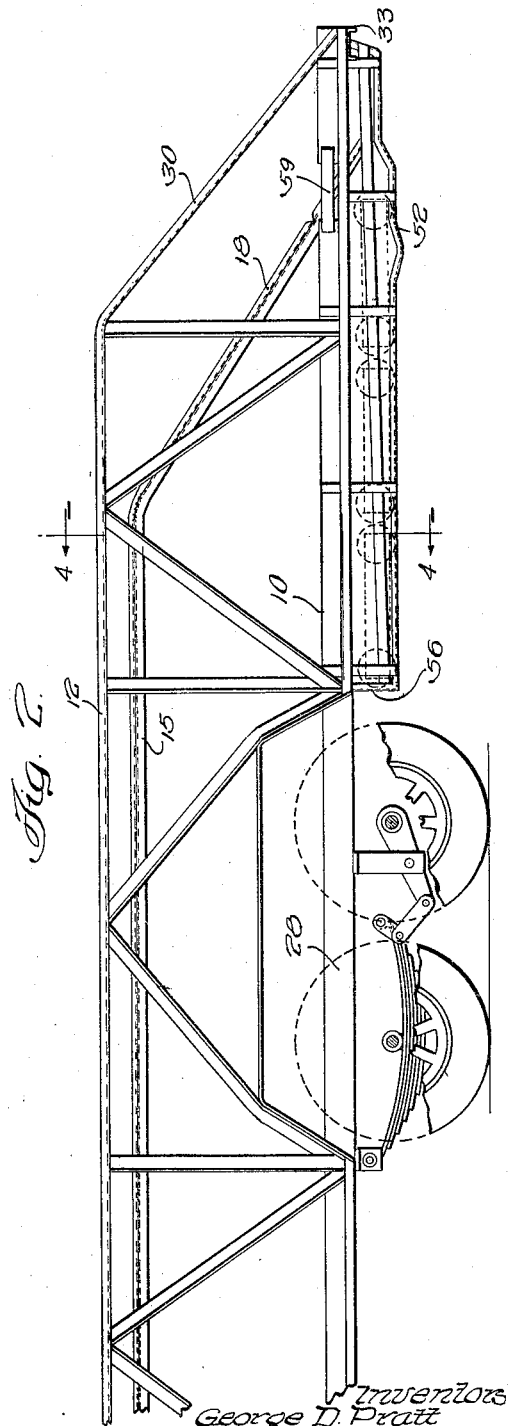
Inventors
George D. Pratt
Henry E. Guillaume
By Hill & Hill
Attys.

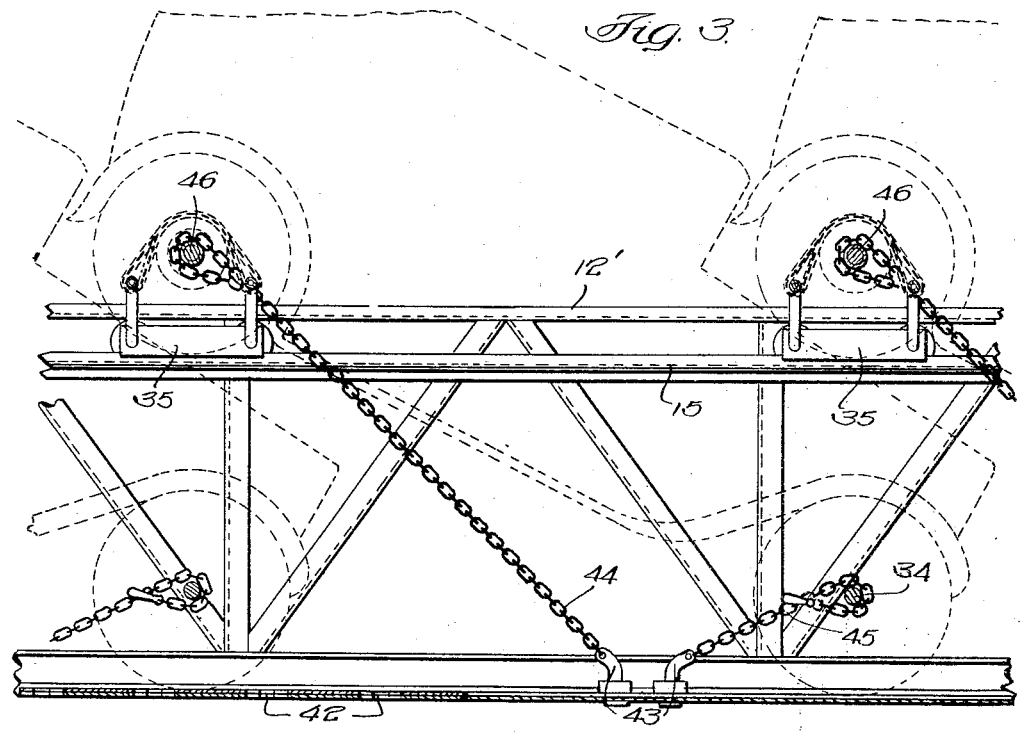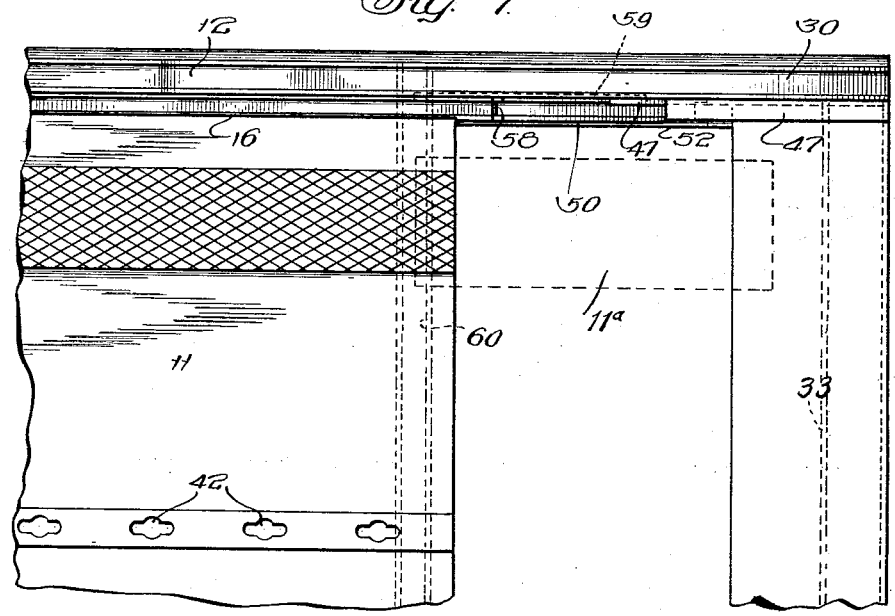

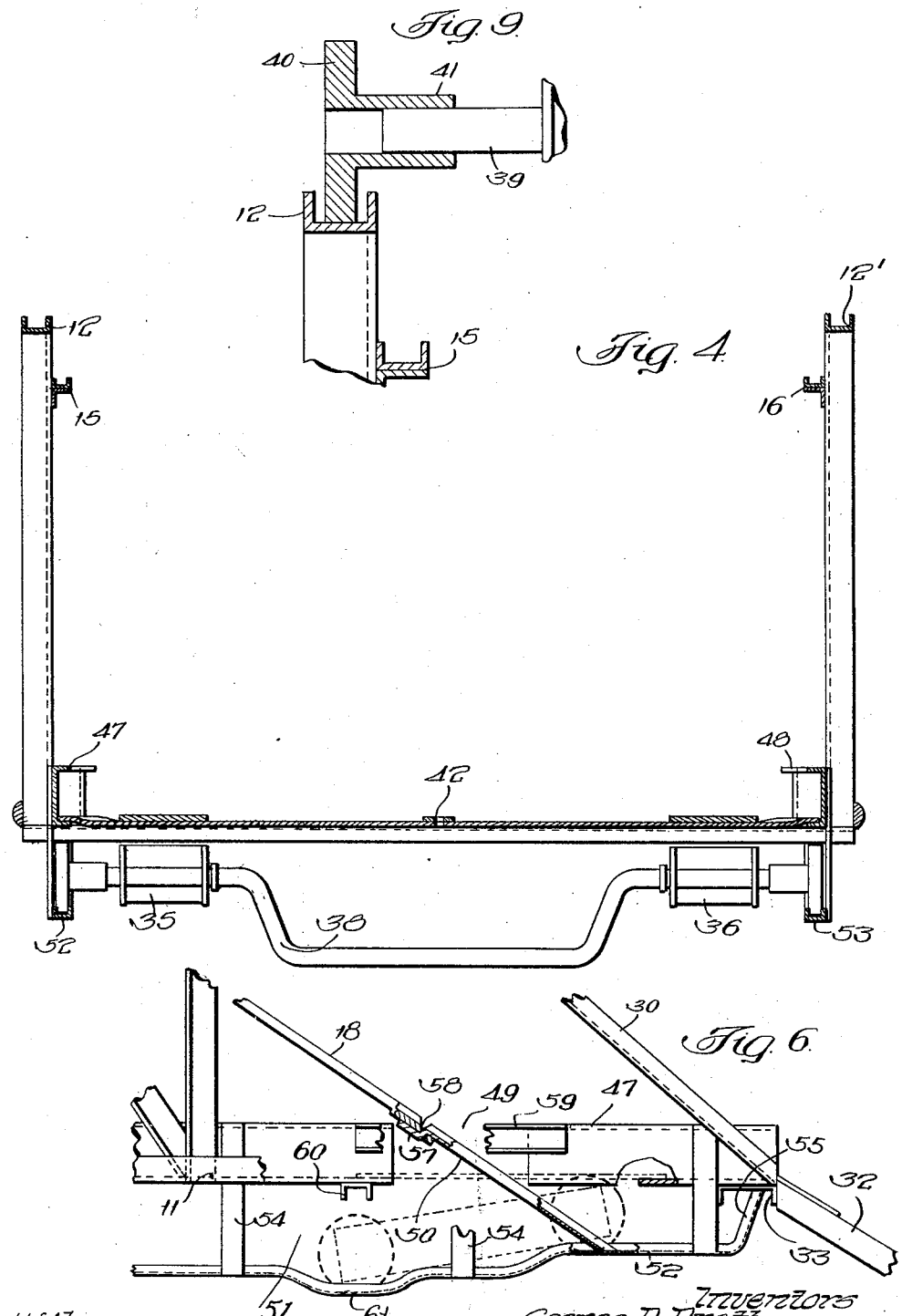

Nov. 8, 1932.  G. D. PRATT ET AL  1,887,325
TRAILER
Filed May 21, 1930  4 Sheets-Sheet 4
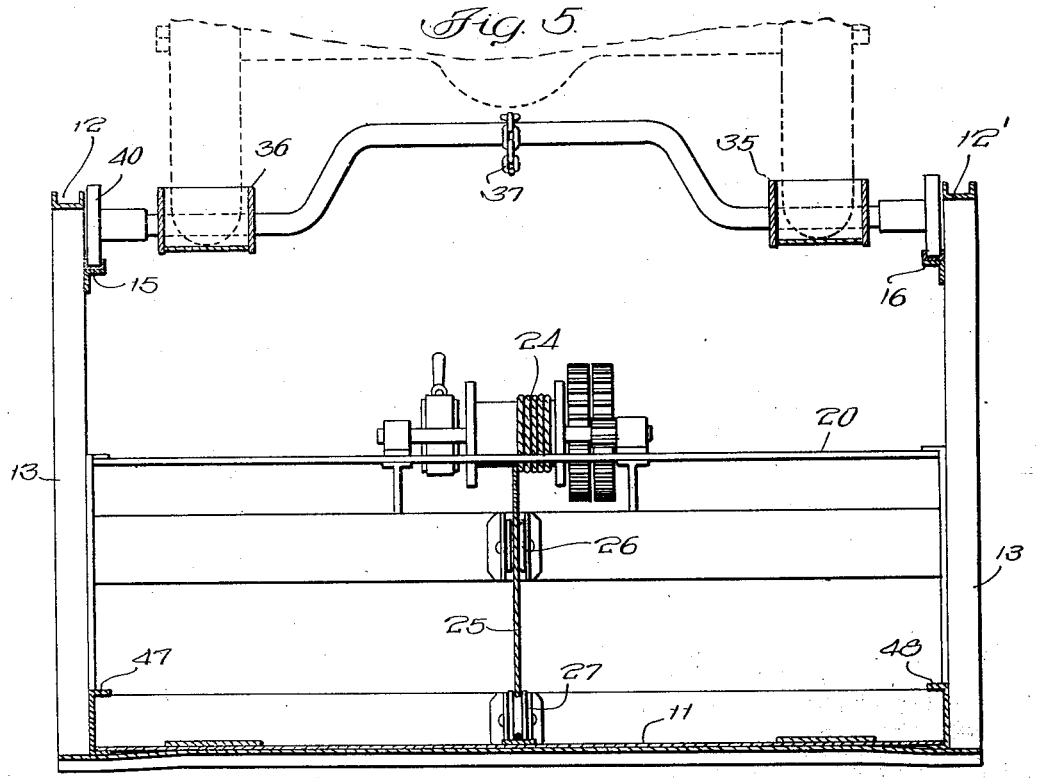
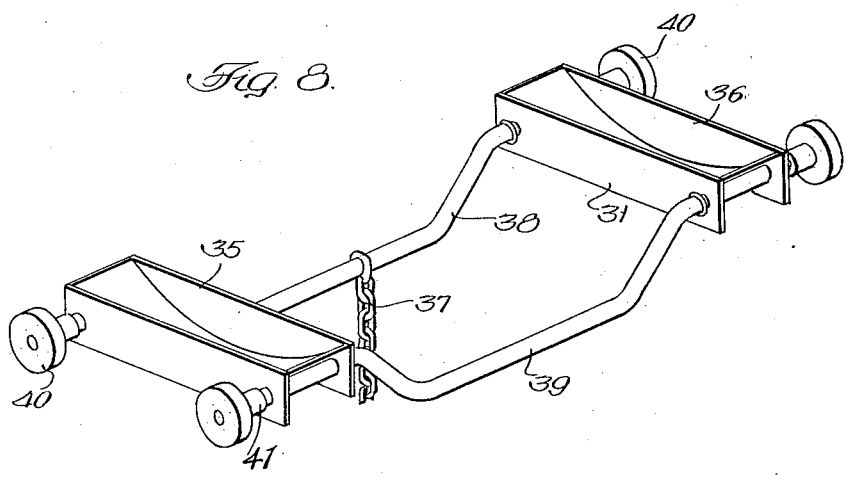
Witness
William P. Kilroy
Inventors
George D. Pratt
Henry C. Guillaume
By Hill & Hill
attys.

Patented Nov. 8, 1932

1,887,325

UNITED STATES PATENT OFFICE

GEORGE D. PRATT AND HENRY C. GUILLAUME, OF CHICAGO, ILLINOIS, ASSIGNORS TO GERALD L. DANIELS AND RAYMOND DANIELS, BOTH OF CHICAGO, ILLINOIS

TRAILER

Application filed May 21, 1930. Serial No. 454,422.

The invention relates to trucks or conveyances and particularly to that type which is designed to transport other vehicles such as automobiles.

The invention has as one of its principal objects the provision of a truck having means whereby a vehicle such as an automobile may be loaded upon the truck and be arranged in a manner so that one end of one automobile overlaps another to thereby increase the number of cars which may be transported at one time.

A further object of the invention is to provide a construction capable of accomplishing the above which may, when occasion demands, be employed to transport commodities other than automobiles, as for instance, the truck may be loaded with automobiles at an automobile factory and on its return trip carry any other commodity which the automobile company may be desirous of having delivered to it such as radiators, fenders or any other article they may employ.

A further object of the invention is to provide a construction which may be connected with the ordinary trailer truck, the construction having means whereby it may be supported at one end during the loading operation and during the period at which the trailer truck may be in use for some other purpose.

Another object of the invention is to provide a truck or conveyance with a platform having side frames arranged at opposite edges of the platform, the side frames providing tracks which extend from the platform and have a portion thereof elevated relatively to the platform to thereby permit an automobile to have one end thereof arranged upon the inclined portion of the track and upon a further movement have said end moved along the track and be elevated relatively to the platform and the opposite end of the automobile to thereby allow several automobiles to be arranged in an overlapping relation upon the truck with one end supported in an elevated position with the other end supported by the platform.

The invention has as another object the provision of means whereby an automobile may be conveyed and arranged in the manner just described and in addition to provide carriages which are operable along the tracks, the carriages providing a support for that end of the automobile which is elevated, during movement thereof along the tracks.

It is an object to provide means for releasably locking an automobile in position relatively to the truck.

A further object of the invention is to provide means for storing or housing said carriages when in disuse.

The invention has as another object the provision of carriages with means whereby an element thereof may pass over the front end of a vehicle already arranged for transportation within the truck.

The invention has these and other objects, all of which will be readily understood when read in conjunction with the accompanying drawings which illustrate one embodiment of which the invention is susceptible, it being obvious that changes and modifications may be resorted to without departing from the spirit of the appended claims forming a part hereof.

In the drawings, Fig. 1 is a side elevation of one end of a truck constructed to accomplish the above mentioned and other advantages;

Fig. 2 is a side elevation of the opposite end of the truck shown in Fig. 1;

Fig. 3 is a side elevation of a portion of the structure shown in Figs. 1 and 2 showing the manner in which a vehicle is arranged upon the truck for transportation by the truck;

Fig. 4 is a section taken on line 4—4 of Fig. 2;

Fig. 5 is a section taken on line 5—5 of Fig. 1;

Fig. 6 is a side elevation of a portion of the structure shown in Fig. 2, certain parts being broken away for the purpose of illustration;

Fig. 7 is a plan view of a portion of the platform of the vehicle;

Fig. 8 is a perspective view of a carriage or vehicle support adapted to ride upon the track of the structure shown in Figs. 1 and 2 and to support one end of a vehicle during movement thereof along said track; and Fig. 9 is a detailed sectional view of a portion of the structure shown in Fig. 8.

The structure illustrated in the embodiment of the invention disclosed in the drawings contemplates the provision of a truck box or body generally designated 10, and includes a floor or platform 11, and top rails 12—12′ which are secured to the opposite sides of the platform by means of uprights and struts designated 13 and 14. The structure just described comprises the box of the truck within which automobiles and other articles may be arranged for transportation. Members respectively designated 15 and 16 which may, when occasion demands, also be employed as tracks are also secured to the struts and uprights and extend longitudinally from the uprights 17 located at the forward end of the truck to the rearmost upright 13, from which said rails extend downwardly as indicated at 18 to adjacent the rear end of the platform. The side rails 12 and 12′ and the tracks 15 and 16 are spot-welded or otherwise secured to the struts and uprights and the side sills, hereinafter to be referred to and are therefore securely held with relation to the remaining structure forming the box or body of the truck. The forward end 19 of the truck is provided with a platform 20 having a table 21 secured thereto, the table being adapted to be associated with the turn-table 22 of a motor truck 23. The platform 20 provides a support for a wench 24. This wench 24 is provided to produce means upon which to wind and unwind a cable 25 which travels over pulleys respectively designated 26 and 27, the latter of which is located near the platform 11.

The truck body generally designated 10 is provided with a wheeled support 28, the latter being located adjacent the rear end of the structure. The forward end of the truck is provided with a supporting leg 29 which is brought into use to support the forward end of the truck during the loading operation of the truck and when this last mentioned end of the truck is disconnected from the motor truck generally designated 23.

It will be noted that the tracks 15 and 16 are arranged a suitable distance below the top or side rails 12—12′ to thereby provide means through the agency of these top rails for holding vehicles arranged upon said tracks against lateral displacement when arranged with the body of the conveyance. It will be noted by referring to Fig. 3 that the top rails 12—12′ are both channel-shaped and that the ends thereof such as 30 decline toward the platform 11 in a manner similar to the tracks 15 and 16 and thus may, when occasion demands, provide rails for supporting vehicles mounted within the truck body. The invention contemplates the utilization of carriages such as are most clearly shown in Fig. 8 and generally designated 31 which are adapted to be arranged upon the rails 15 and 16 or the top rails 12—12′ to assist in conveying an automobile along the tracks. In practice, the carriages are positioned at the end of the incline of the rails to receive the rear wheels of the vehicle during the loading operation, and of course are brought to this same position during the unloading operation to allow the automobile to be discharged from the carriages.

A skid 32 is rested upon the platform including the channel 33. The free end of the cable 25 is secured to the front axle of an automobile such as 34, the cable 25 is then wound upon or wound from the drum of the wench 24 which will thus control movement of the automobiles during the unloading operation and also cause the rear end of the automobile to be drawn over the skids 32 during the loading operation. The carriages generally designated 31 each include receptacles respectively designated 35 and 36 which are preferably dished to thus provide a structure which, in effect, provides a chock to hold the rear wheels against displacement relatively to the carriage. During the loading operation the cable 25 is wound around the wench which causes the truck 31 to travel upwardly of either of the inclined portions of the rails 15, 16 or 12—12′ and then along the horizontal portion thereof with the forward end of the automobile riding upon the removable planks or supports 11a which convey it to the platform 11. The automobile is drawn along either pair of rails to the desired position relatively to the truck platform and is then releasably locked with the rear end of the automobile elevated relatively to the forward end thereof. It is, of course, understood that the carriages such as shown in Fig. 8 are releasably connected with the rear axle of the automobile, the particular means for accomplishing this may include a chain section such as 37 which is connected to a shaft 38 of the carriage generally designated 31. The chain section may be wrapped around the rear axle of the automobile and then connected to the other shaft such as 39 of the carriage generally designated 31. These shafts 38 and 39 extend through and support the receptacles 35 and 36, and each of these shafts have their opposite ends provided with a roller such as 40 which is adapted to ride upon the tracks hereinbefore referred to. Each of these rollers 40 is provided with a tubular extension 41 in which the ends of the shafts such as 38 and 39 are respectively journalled, the shafts being also rotatably mounted relatively to the receptacles 35 and 36. These shafts 38 and 39 are bent or bowed between the receptacles, and are constructed in this manner so that when these shaft sections are connected with the rear axle of an automobile, the bowed portion extends in an upwardly direction to thereby allow this portion to be passed over the hood of an automobile previously mounted within the body of the truck generally designated 10. After the automobile is located in the desired position upon the rails within the truck body, said automobiles are releasably anchored to the truck body. To accomplish this last mentioned feature, the platform is provided throughout intervals of its length with a plurality of key-hole-shaped apertures 42 through which one end of an anchor 43 having an enlargement is adapted to be inserted and then moved to the smaller portion of the key-hole-shaped opening which will lock this end of the stays or cables such as 44 and 45 relatively to the platform. The opposite ends of these stays are respectively connected with the front and rear axles 34 and 46 of the automobile arranged for transportation by the truck which will thus anchor said automobile in position within the truck body. It is evident that when unloading of the automobiles from the truck is desired, all that is necessary is to disconnect the ends of the cables from the axles of the automobile which will free the automobile and allow them to be moved toward the rear end of the truck, it being understood that the cable 25 is connected to the front axle of the particular car being unloaded to thereby regulate or control movement thereof toward this end of the truck. When the dished receptacles of the carriage reach their lowermost position relatively to the inclined portion of the tracks, it can be readily understood that the position and form of the receptacles facilitates removal of the rear wheels therefrom. In addition it is evident that when the receptacles of the carriages are arranged in this last mentioned position to receive the rear wheels of an automobile that the construction of the receptacles assists in accomplishing this last mentioned advantage as it is evident that the rear end of the automobile may be readily rolled into or rolled out of the receptacles of the carriage, it being understood that the carriage is removed from the platform after it has performed this function.

As before stated, the invention also contemplates the provision of means for housing the carriages such as shown in Fig. 8 in a manner so that they will not consume any space within the truck body. This is of advantage since on occasions it is desirable to load the truck body with commodities which do not require the carriages for the purpose of loading or unloading the truck. To this end, provision is made below the platform in the form of a compartment within which to arrange the carriage. To facilitate insertion of the carriages within the compartment just referred to, the platform 11 and side frames 47 and 48 of the truck frame are each constructed to provide an opening 49 and the tracks such as 15 and 16 are each provided with a removable track section 50, which provides a gate controlling the passage of the carriages through the opening 49. These openings 49 lead to the compartment generally designated 51 which is formed by the platform and the rails 52 and 53 which are spaced a suitable distance below the platform and side sills 47 and 48, the rails 52 and 53 being held in this relation relatively to the remainder of the truck frame through the medium of the supports 54—54. The compartment thus formed is closed at one end by means of the upturned portion 55 of the rails 52 and 53, the opposite end of the compartment being closed in any suitable manner, as, for instance, that indicated at 56 in Fig. 2.

As before stated, the side rails such as 15 and 16 are each provided with removable track sections such as 50, these track sections 15—16 and 50 being releasably locked together by means of the shouldered tongue 57 which is passed through an aperture 58 provided in the rail sections 15—16.

When it is desired to introduce one or more of the carriages into the compartment 51, the removable rail sections 50 are disconnected from the rail sections 15—16 and one end of a carriage is then passed through the opening 49 provided in the side sills or rails 47 and 48 and is then moved relatively to the rails 52 to arrange the opposite end of the carriage so that it may be passed through the opening 49. After the opposite end of the carriage has been passed through the opening 49, the rollers 40 rest upon the respective rails 52 and 53 which will allow the carriages to be moved toward the front end of the compartment 51 in which they may be stored until occasion for their use again arises.

To provide the necessary strength at the opening 49, the sections of the side sills 47 and 48 are connected together through the agency of a reenforcing bar 59 which connects the respective sections of the side sills together and a cross piece 60 is employed to further increase the strength of the structure at this point. This reenforcing cross beam 60 is located below the lowermost flange of the side sills 47 and 48 and the rails 52 and 53, the rails 52 and 53 of the compartment 51 are each provided with a depression 61 to allow for clearance between the reenforcing beam 60 and the adjacent portion of these tracks and thus permit the wheels of the carriage to clear the cross beam 60 and allow said wheels to be passed beyond said beam.

When the carriages are located below the platform 11 in the manner just described, the shaft sections 38 and 39 may, if so desired, have the chain section 37 connected thereto in a manner to hold the shaft sections in a more or less elevated condition to prevent interference between them and some obstruction on the road.

From the foregoing description of the invention, it is manifest that a simple construction is provided for transporting vehicles such as automobiles which includes means for elevating one end of the vehicles contained within the truck body relatively to the platform of the truck body. It is further evident that the use of the carriages hereinbefore referred to provides means for permitting the vehicles to be easily moved along the rails. It is further manifest that the structure includes means in which to house the several carriages in a manner so that the truck body may be employed entirely for the transportation of other commodities such as hereinbefore referred to.

Having thus described the invention, what we claim and desire to cover by Letters Patent is:

1. In a device of the character described, in combination, a conveyance having a platform, a framework located adjacent the opposite edges of the platform, said framework providing a track having a portion which is elevated relatively to the platform and having a portion thereof inclined toward said platform to thereby provide means for elevating and supporting one end of a vehicle conveyed along said track, and means for releasably securing the vehicle at various positions with respect to the track.

2. In a device of the character described, in combination, a conveyance having a platform, a framework located adjacent opposite edges of the platform, said framework providing a track which is elevated relatively to the platform and having a portion which is inclined toward said platform to thereby provide means for elevating and supporting one end of a vehicle conveyed along said track, said track including a removable section providing a gate controlling a storage compartment.

3. In a conveyance of the kind described having a platform, a plurality of rails providing a track having a portion elevated relatively to the platform, and a portion inclined toward the platform, a carriage in which one end of a vehicle is adapted to be arranged, said carriage being movable along the track to elevate said end of the vehicle, said carriage having a shaft which extends from one rail to the other, said shaft being bent between the ends thereof to allow said carriage to be passed over an end of a vehicle, having the opposite end supported by said track.

In witness whereof, we hereunto subscribe our names this 18th day of October A. D., 1929.

HENRY C. GUILLAUME.
GEO. D. PRATT.